United States Patent
Iyer et al.

(10) Patent No.: US 11,508,395 B1
(45) Date of Patent: Nov. 22, 2022

(54) INTELLIGENT SELECTION OF AUDIO SIGNATURES BASED UPON CONTEXTUAL INFORMATION TO PERFORM MANAGEMENT ACTIONS

(71) Applicant: Dell Products, L.P., Round Rock, TX (US)

(72) Inventors: Vivek Viswanathan Iyer, Austin, TX (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 22 days.

(21) Appl. No.: 17/246,747

(22) Filed: May 3, 2021

(51) Int. Cl.
  *G10L 25/51* (2013.01)
  *G10L 17/06* (2013.01)

(52) U.S. Cl.
  CPC ............. *G10L 25/51* (2013.01); *G10L 17/06* (2013.01)

(58) Field of Classification Search
  CPC ....................................................... G10L 25/51
  See application file for complete search history.

(56) References Cited

U.S. PATENT DOCUMENTS

| | | | |
|---|---|---|---|
| 8,977,067 B1* | 3/2015 | Baluja | G10L 19/02 382/240 |
| 2005/0038819 A1* | 2/2005 | Hicken | G11B 27/105 |
| 2006/0190450 A1* | 8/2006 | Holm | G11B 27/28 |
| 2014/0106663 A1* | 4/2014 | Jurascheck | H04H 60/37 455/3.06 |
| 2018/0121796 A1* | 5/2018 | Deisher | G06N 3/0472 |
| 2019/0108187 A1* | 4/2019 | Coover | G06F 16/683 |
| 2019/0213214 A1* | 7/2019 | Schalkwijk | G10L 25/51 |
| 2021/0157838 A1* | 5/2021 | Berrian | G06F 16/683 |
| 2022/0101869 A1* | 3/2022 | Wichern | G10L 25/24 |
| 2022/0130415 A1* | 4/2022 | Garrison | G10L 15/04 |
| 2022/0165292 A1* | 5/2022 | Saki | H04R 1/08 |

* cited by examiner

Primary Examiner — Olisa Anwah
(74) Attorney, Agent, or Firm — Fogarty LLP

(57) ABSTRACT

Embodiments of systems and methods for intelligently selecting audio signatures based upon context information to perform management actions are described. In some embodiments, an Information Handling System (IHS) may include a processor and a memory coupled to the processor, the memory having program instructions stored thereon that, upon execution, cause the IHS to: select, based upon context information, a subset of a plurality of audio signatures, compare a received audio input to at least one audio signature among the subset of audio signatures to the exclusion of any other audio signature of the plurality of audio signatures, and, in response to the comparison indicating a match, perform one or more management actions.

20 Claims, 3 Drawing Sheets

INTELLIGENT SELECTION OF AUDIO SIGNATURES BASED UPON CONTEXTUAL INFORMATION TO PERFORM MANAGEMENT ACTIONS

FIELD

The present disclosure relates generally to Information Handling Systems (IHSs), and more particularly, to systems and methods for intelligently selecting audio signatures based upon context information to perform management actions.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for intelligently selecting audio signatures based upon context information to perform management actions are described. In an illustrative, non-limiting embodiment, an Information Handling System (IHS) may include a processor and a memory coupled to the processor, the memory having program instructions stored thereon that, upon execution, cause the IHS to: select, based upon context information, a subset of a plurality of audio signatures, compare a received audio input to at least one audio signature among the subset of audio signatures to the exclusion of any other audio signature of the plurality of audio signatures, and, in response to the comparison indicating a match, perform one or more management actions. In some cases, the comparison may be performed by a neural co-processor or accelerator coupled to the processor.

The program instructions, upon execution, may cause the IHS to select a number of audio signatures in the subset of audio signatures based upon at least one of: a model concurrency, or latency specification of the neural co-processor or accelerator. The plurality of audio signatures may include at least one of: a signature of a voice of a user of the IHS, a signature of a voice man, a signature of a voice of a woman, a signature of a voice of a child, a crying signature, a dog signature, a cat signature, a doorbell signature, a weather signature, a traffic signature, a car signature, a train signature, a home appliance signature, a lawnmower signature, a television signature, a video signature, a music signature, or a radio station signature.

The program instructions, upon execution, may also cause the IHS to select the one or more management actions based upon a combination of the match and the context information.

The context information may include at least one of: an identity of a user, a time-of-day, or a location of the IHS. Additionally, or alternatively, the context information may include a calendar event. Additionally, or alternatively, the context information may include least one of: an application under execution, or a duration of execution of an application. Additionally, or alternatively, the context information may include at least one of: a user's presence, a user's proximity to the IHS, or a user's gaze direction. Additionally, or alternatively, the context information may include at least one of: a memory usage, a characteristic of a network connection, a power usage, or a connected peripheral device. Additionally, or alternatively, the context information may include an IHS posture. Additionally, or alternatively, the context information may include selection of a noise cancellation model. Additionally, or alternatively, the context information may include selection of one of a plurality of fan settings. Additionally, or alternatively, the context information may include selection of one of a plurality of a power consumption settings.

Moreover, the one or more management actions may include execution or cessation of a diagnostics or remediation process. Additionally, or alternatively, the context information may include execution or cessation of a system update process. Additionally, or alternatively, the context information may include execution or cessation of a telemetry collection process. Additionally, or alternatively, the context information may include setting the IHS in a selected security or locked mode.

In another illustrative, non-limiting embodiment, a memory storage device may have program instructions stored thereon that, upon execution by an IHS, cause the IHS to: select, based upon context information, a subset of a plurality of audio signatures; compare a received audio input to at least one audio signature among the subset of audio signatures to the exclusion of any other audio signature of the plurality of audio signatures, where the comparison is performed by a neural co-processor or accelerator coupled to the processor, and where a number of audio signatures in the subset of audio signatures is based upon at least one of: a model concurrency, or latency specification of the neural co-processor or accelerator; and in response to the comparison indicating a match, perform one or more management actions, where the one or more management actions are selected based upon the context information.

In yet another illustrative, non-limiting embodiment, a method may include: selecting, based upon context information, a subset of a plurality of audio signatures; comparing a received audio input to at least one audio signature among the subset of audio signatures to the exclusion of any other audio signature of the plurality of audio signatures, where the comparison is performed by a neural co-processor or accelerator coupled to the processor, and where a number of audio signatures in the subset of audio signatures is based upon at least one of: a model concurrency, or latency specification of the neural co-processor or accelerator; and in response to the comparison indicating a match, performing one or more management actions, where the one or more management actions are selected based upon the context information.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
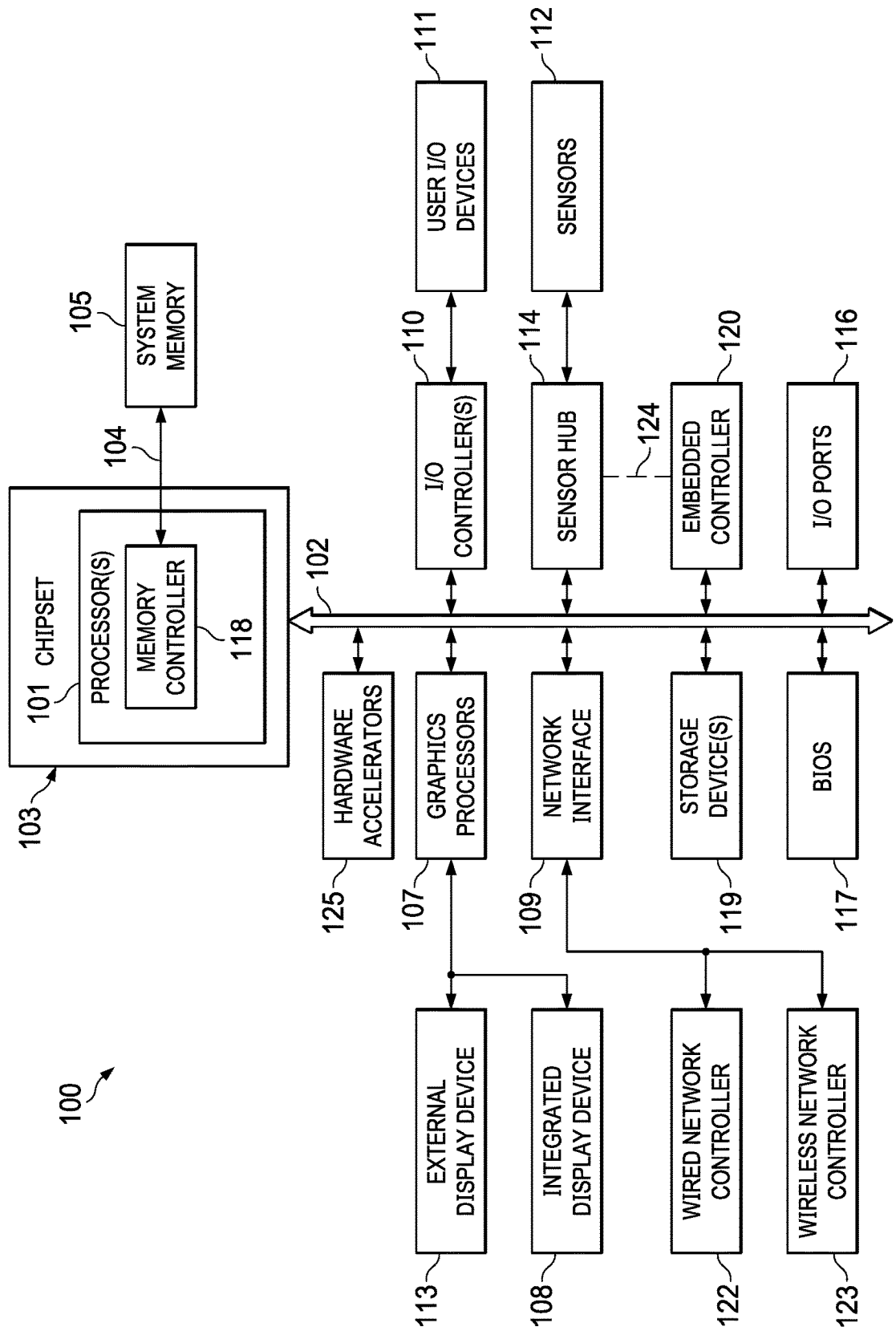
FIG. 1 is a block diagram of an example of an Information Handling System (IHS) configured to intelligently select audio signatures based upon context information to perform management actions, according to some embodiments.

Systems and methods are described for intelligently selecting audio signatures based upon context information to perform management actions in an Information Handling System (IHS). In some embodiments, these systems and methods may facilitate the use of machine learning (ML) and artificial intelligence (AI) hardware accelerators, sometimes provided as a companion die architecture (e.g., a system-on-chip or "SOC") separate from a main IHS processor. Examples of such hardware accelerators include, but are not limited to, INTEL's Gaussian Neural Accelerator (GNA), Audio and Contextual Engine (ACE), Vision Processing Unit (VPU), etc.

In various implementations, systems and methods described herein may enable the use of non-location-based methods (e.g., using context information such as time of day, calendar information, etc.) to infer a user's preset needs and control use-cases, related to systems and/or session management. For example, these systems and methods may enable a commercial or enterprise user to: (a) configure, calibrate, and use directional audio signatures with presets for those signatures; (b) select systems management functionality such as power management with fast charging; and/or (c) select session management functionality such as display or audio output settings.

To illustrate the foregoing, consider a situation where a user works from his home office most of the time. The user has certain audio sources from the environment that are picked up by his IHS depending on time of day, day of week, and so on (e.g., a lawnmower comes on every other Friday at around 8:00 AM, the neighbor's dog barks at around noon every day, etc.). It would be desirable to know, based on time of day, type of meeting on calendar, audio input activity from the user, as well as other ambient sounds, which systems management mode to set the user's IHS. As such, systems and methods described herein may tie presets to directional audio signatures to indicate what GNA settings to apply and/or which GNA models to load for noise cancellation—given that GNA has constraints on latency and model concurrency.

Additionally, or alternatively, systems and methods described herein may, based upon directional audio signatures for incoming audio, select a user preset for systems management, and then configure the IHS for a preset to control or lower a fan noise (e.g., by increasing or reducing a step on a cooling curve or table), diminish the IHS's power consumption by reducing a display's resolution, etc. Such a preset may be generally referred to as a "quiet mode" and it may be tied to, or triggered by, the presence of a specific audio source(s) in combination with other context information (e.g., an imminent calendar or meeting event, etc.).

Additionally, or alternatively, systems and methods described herein may use directional audio signatures for diagnostics self-healing and/or remediation purposes (e.g., monitoring of fan acoustic curves from an audio signature point-of-view to determine that the fan is taking longer to ramp up to its maximum speed, thus indicating the possibility of a dirty or malfunctioning fan).

Additionally, or alternatively, systems and methods described herein may, based upon the detection of: (a) the user's voice using a corresponding audio signature towards the end of a video conference (e.g., "I am going to take a lunch break and step away") along with (b) other context information (e.g., external displays being powered off, lack any upcoming meetings in the user's calendar application, etc.), determine that the user is stepping away from the IHS. In response to the detection, these systems and methods may perform a corresponding session management operation such as "Walk Away Lock" with lid closed and docked.

Additionally, or alternatively, systems and methods described herein may, based upon audio signatures from a room where the IHS is, determine the relative volume or number of users nearby, along with system calendar information (e.g., off working hours etc.), to perform managed system updates such as application updates and telemetry collection processes.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 is a block diagram illustrating components of IHS 100 configured to select audio signatures based upon context information to perform management actions. As shown, IHS 100 includes one or more processors 101, such as a Central Processing Unit (CPU), that execute code retrieved from system memory 105.

Although IHS 100 is illustrated with a single processor 101, other embodiments may include two or more processors, that may each be configured identically, or to provide specialized processing operations. Processor 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE).

Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and/or 113, coupled to IHS 100.

One or more display devices 108 and/or 113 coupled to IHS 100 may utilize LCD, LED, OLED, or other display technologies. Each display device 108 and 113 may be capable of receiving touch inputs such as via a touch controller that may be an embedded component of the display device 108 and/or 113 or graphics processor 107, or it may be a separate component of IHS 100 accessed via bus 102. In some cases, power to graphics processor 107, integrated display device 108 and/or external display 133 may be turned off or configured to operate at minimal power levels in response to IHS 100 entering a low-power state (e.g., standby).

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100.

In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data.

For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

In some cases, one or more sensors 112 may be part of a keyboard or other input device. Processor 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a first display 108 may be facing the user at an obtuse angle with respect to a second display surface of a second display 108 or a physical keyboard portion. In a tablet posture, a first display 108 may be at a straight angle with respect to a second display 108 or a physical keyboard portion. And, in a book posture, a first display 108 may have its back resting against the back of a second display 108 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor 101 may process user presence data received by sensors 112 and may determine, for example, whether an IHS's end-user is present or absent. Moreover, in situations where the end-user is present before IHS 100, processor 101 may further determine a distance of the end-user from IHS 100 continuously or at pre-determined time intervals. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor 101 may receive and/or produce context information using sensors 112 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit (VC) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, chipset 103 may provide processor 101 with access to hardware accelerator 125. Examples of hardware accelerators may include, but are not limited to, INTEL's Gaussian Neural Accelerator (GNA), Audio and Contextual Engine (ACE), Vision Processing Unit (VPU), etc. In some cases, hardware accelerator 125 may be used to perform ML and/or AI operations offloaded by processor 101. For instance, hardware accelerator 125 may load a number of audio signatures and/or settings, and it may identify an audio source by comparing an audio input to one or more audio signatures until it finds a match.

In some cases, however, hardware accelerator 125 may have significant model concurrency and/or processing latency constraints relative to processor 101. Accordingly, in some cases, context information may be used to select a subset of all possible audio signatures, and the number of signatures in the subset may be chosen based upon a maximum model concurrency (e.g., only two or three signatures of a given size can be processed at a time) or latency characteristics (e.g., with 4 signatures or more, detection latency becomes unacceptable) of hardware accelerator 125.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
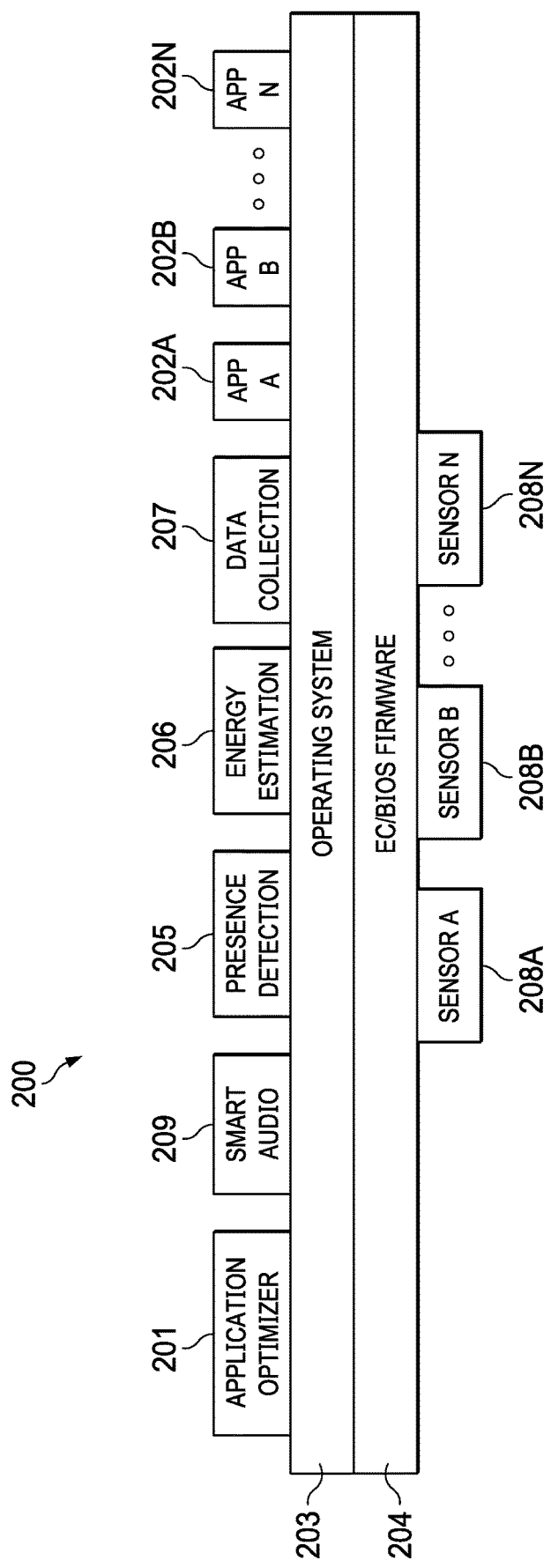
FIG. 2 is a block diagram illustrating an example of a logic system configured to intelligently select audio signatures based upon context information to perform management actions, according to some embodiments.

FIG. 2 is a block diagram illustrating an example of logic system 200 produced by IHS 100 for selecting audio signatures based upon context information to perform management actions. In some embodiments, each element of logic system 200 may be provided by IHS 100 through the execution of program instructions by one or more logic components (e.g., CPU 101, hardware accelerator 125, BIOS 117, EC 120, etc.) stored in memory (e.g., system memory 105), storage device(s) 119, and/or firmware 117, 120.

As shown, logic system 200 includes application optimizer engine 201 configured to manage the performance optimization of applications 202A-N. An example of application optimizer engine 201 is the DELL PRECISION OPTIMIZER Meanwhile, examples of applications 202A-N include, but are not limited to, computing resource-intensive applications such as remote conferencing applications, video editors, image editors, sound editors, video games, etc.; as well as less resource-intensive applications, such as media players, web browsers, document processors, email clients, etc.

Both application optimizer engine 201 and applications 202A-N are executed by OS 203, which is in turn supported by EC/BIOS instructions/firmware 204. EC/BIOS firmware 204 is in communications with, and configured to receive data collected by, sensor modules or drivers 208A-N—which may abstract and/or interface with respective ones of sensors 112.

In various embodiments, logic system 200 also includes presence detection module or application programming interface (API) 205, energy estimation engine or API 206, data collection module or API 207, and/or smart audio engine 209 executed above OS 203.

Presence detection module 205 may process user presence data received by one or more of sensor modules 208A-N and it may determine, for example, whether an IHS's end-user is present or absent. Moreover, in cases where the end-user is present before the IHS, presence detection module 205 may further determine a distance of the end-user from the IHS continuously or at pre-determined time intervals. The detected or calculated distances may be used by presence detection module 205 to classify the user as being in the IHS's near-field, mid-field, or far-field.

Energy estimation engine 206 may include, for example, the MICROSOFT E3 engine, which is configured to provide energy usage data broken down by applications, services, tasks, and/or hardware in an IHS. In some cases, energy estimation engine 206 may use software and/or hardware sensors configured to determine, for example, whether any of applications 202A-N are being executed in the foreground or in the background (e.g., minimized, hidden, etc.) of the IHS's graphical user interface (GUI).

Data collection engine 207 may include any data collection service or process, such as, for example, the DELL DATA VAULT configured as a part of the DELL SUPPORT CENTER that collects information on system health, performance, and environment. In some cases, data collection engine 207 may receive and maintain a database or table that includes information related to IHS hardware utilization (e.g., by application, by thread, by hardware resource, etc.), power source (e.g., AC-plus-DC, AC-only, or DC-only), etc. In other cases, data collection engine 207 may collect information from one or more applications (e.g., calendar events, etc.)

In operation, application optimizer engine 201 monitors applications 202A-N executing on IHS 100. Particularly, application optimizer engine 201 may gather data associated with the subset of I/O parameters for a predetermined period of time (e.g., 15, 30, 45, 60 minutes or the like). For each of applications 202A-N, the classifier may use the gathered data to characterize the application's workload with various settings, memory usage, responsiveness, etc.

Smart audio engine 209 may be configured to perform directional audio signature detection based on context information (e.g., a calendar meeting may have two or more systems management presets, each applicable in response to a distinct audio environment), and to apply corresponding management settings.

In some embodiments, smart audio engine 209 may communicate with counterpart service running at the OS or firmware (FW) level (e.g., ISH, EC, BIOS) that interfaces, for example, with an Advanced Configuration and Power Interface (ACPI) Windows Management Instrumentation (WMI) driver and and/or WMI service. The FW service may configure and perform the detection of directional audio sources as models in a hardware accelerator engine via concurrent operation of hardware accelerator 125. Furthermore, the FW service may be configured to aggregate results across multiple acceleration cores, and to send those results to smart audio engine 209.

In operation, during a configuration phase of smart audio engine 209, a user (or IT decision maker) records and saves directional audio presets and corresponding, responsive management action(s). During the recording, smart audio engine 209 may perform a blind separation of audio sources, and it may request that the user tag each source with an audio source present label from a list of known presets to have an ML/AI model from a local or backend database identify the audio preset. Additionally, smart audio engine 209 may save additional information such as the duration, intensity, and direction of each audio source or signal. The combination of the audio preset ML model and additional information may be referred to as "audio source tuple." Moreover, each directional audio present may include a list of audio source tuples across multiple audio sources.

In a steady-state phase, based upon any suitable combination of the context information described herein, (e.g., time of day, meeting or calendar activity, IHS posture, etc.), smart audio engine 209 may pre-load a subset of directional audio presets that corresponding to the context information from the database through an ML/AI plugin at runtime. When the aforementioned FW service is implemented, smart audio engine 209 may communicate the directional audio presents to such service, and it may then monitor inputs from that service (e.g., event driven). Upon detecting inputs, smart audio engine 209 may determine which present among the subset of presents was detected (e.g., using shortest Euclidian distance). In response, smart audio engine 209 may trigger one or more system or session management commands identified, for example, in a configuration policy or the like.

From the perspective of the FW service, in steady state operation, it may: receive directional audio detect presets from smart audio engine 209 (which are a subset of all presents available due to model concurrency and/or latency constraints of hardware accelerator 125), parse each tuple from the audio presets, set up offload cores in hardware accelerator 125 with appropriate audio source preset ML/AI model, and monitor or detect inputs from the offload cores—which detect audio source tuples, that is, audio source preset plus direction, intensity, etc. using any suitable classification algorithm (e.g., Logistic, Naive Bayes, Stochastic Gradient Descent, K-nearest Neighbors, etc.). Then, the FW service may parse inputs received from the offload cores and it may provide audio source tuples to smart audio engine 209.

In some cases, enhancements and optimizations of GNA/VPU model execution, distribution, and orchestration may be performed by the FW service to reduce the burden on the OS. FW enablement of GNA/VPU orchestration may also allow for execution logic in low-power or parallel OS environments (e.g., VDI, MS, etc.).

Figure 3:
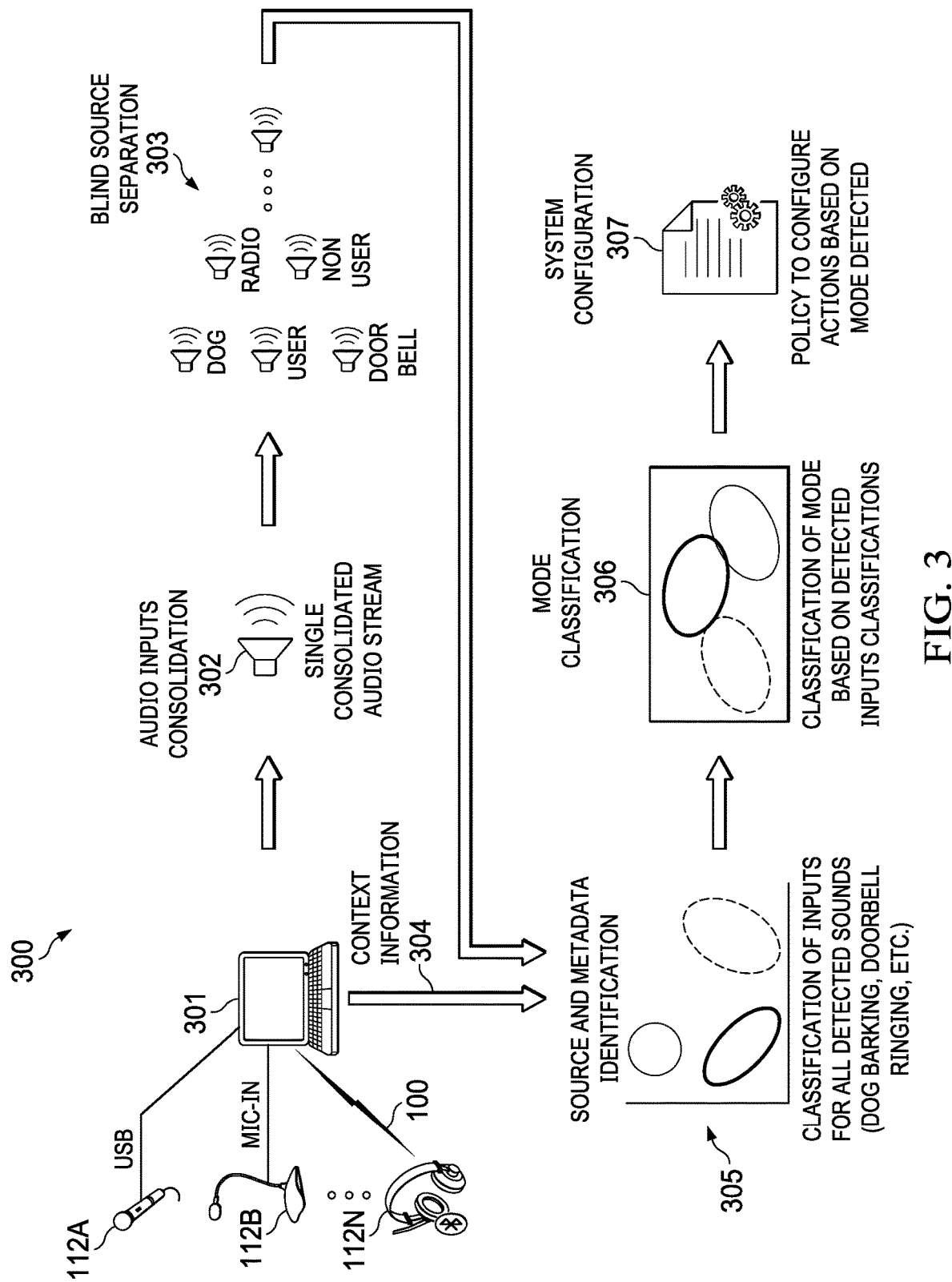
FIG. 3 is a chart illustrating an example of a method for intelligently selecting audio signatures based upon context information to perform management actions, according to some embodiments.

FIG. 3 is a flowchart illustrating an example of method 300 for selecting audio signatures based upon context information to perform management actions. In some embodiments, method 300 may be executed, at least in part, by the operation of smart audio engine 209 and/or application optimizer engine 201. Particularly, at 301, smart audio engine 209 may be configured to receive one or more audio input signals from a plurality of audio capturing devices 112A-N coupled to IHS 100, and to consolidate those inputs. Meanwhile, application optimizer engine 201 may collect user context information and system context information, and it may make such information available to smart audio engine 209.

For example, application optimizer engine 201 may gather contextual inputs and place them a repository or database. Examples of contextual inputs include, but are not limited to: platform/sensor input, eye/facial tracking, I/O (keyboard, mouse, stylus, etc.), location, voice/gesture, biometrics, audio, application/OS/user, foreground and background applications, time spent using an application, other services and processes, time-of-day, calendar/scheduled events, system hardware settings, IHS posture, user proximity, user presence, environmental inputs, memory usage, a characteristic of a network connection, a power usage, attached peripherals, ambient sound, ambient lighting, weather events, etc.

System context information may be collected using sensors 208A-N, whereas user context information may be collected using presence detection module 205, energy estimation engine 206, and/or data collection module 207.

At 302, smart audio engine 209 may consolidate all audio sources into a single stream. At 303, smart audio engine 209 may perform blind source separation by receiving a raw buffer output of consolidated audio inputs and extracting multiple sources $S_i$ (i=0, 1, . . . , S−1), where S is the number of individual audio sources detected (e.g., dog bark, doorbell, radio, main user, etc.). For example, each $S_i$ may be a tuple or combination of: the audio data of source i for a given duration, its direction (e.g., moving down, up, sideways, etc.), and its intensity (e.g., up, down, etc. in frequency, as well as in amplitude or volume).

At 305, smart audio engine 209 may perform source and metadata identification. Particularly, smart audio engine 209 may take each $S_i$ raw audio buffer, and run it against a selection of ML/AI audio classifier/detection models $M_i$. Each of models $M_i$ may include one or more audio signatures, and the selection of a subset of all available modes may be based upon context information 304 received from application optimizer engine 201.

For example, if IHS 100 is in a first posture (e.g., lid closed) at a first location (e.g., at home), a first subset of one or more audio signatures—fewer than all available signatures—may be selected and loaded by hardware accelerator 125. Conversely, if IHS 100 is in a second posture (e.g., laptop mode) at a second location (e.g., at the office), a second subset of one or more audio signatures may be selected and loaded by hardware accelerator 125.

Moreover, $S_i$ may be run across the subset of models. A first output may include a binary output that indicates whether a source is present or absent in an array that is the same size as $M_i$ (e.g., if $M_i$ has 10,000 audio classes for ML, that would be a 10,000 array or binary values $B_i$). A second output may include {start_time, end_time} of the occurrence of each of the models (e.g., a 10,000×2 list $T_i$ that shows that, if something occurred, its start and end time; else null).

At 306, smart audio engine 209 may perform mode classification operations that associate each source with is metadata identification and determine a classification mode. For example, smart audio engine 209 may take as inputs $T_i$ and & across all audio classes, and based on that, it may perform an ML/AI inference (or uses a rules engine) to identify what "mode" the user is in (e.g., the IHS user is at lunch, or not in a meeting). In some cases, the ML/AI engine may have a golden reference that is a user calibration input or UI configuration input for combinations of audio sources or classes that comprise a mode.

At 307, smart audio engine 209 may receive the mode identification as an input and it may identify a list of commands or settings to be executed per policy configured by the IHS user or an IT decision maker as one or more management actions. Configurations may include, but are not limited to, noise cancelation, audio configuration, session management, video collection enhancements (e.g., background concealment, blur, face correction, etc.), privacy settings, etc.

For example, the one or more management actions may include the selection of a noise cancellation model, selection of one of a plurality of fan settings, selection of one of a plurality of a power consumption settings, execution of a diagnostics or remediation process, execution of a system update process, execution of a telemetry collection process, and/or setting the IHS is a selected security or locked mode.

Accordingly, systems and methods described herein may be used to provide the ability to perform dynamic systems or sessions management based upon directional audio signatures presets and learning. At least in part because these systems and methods may employ a discrete hardware accelerator or engines, the power and performance overheads are low. Moreover, these systems and methods may be scaled according to desired fidelity of ML/AI models, as well as frequency of detection (e.g., once a second versus at audio frame rate, and event driven mode classifiers).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
select, based upon context information, a subset of a plurality of audio signatures, wherein the subset of the plurality of audio signatures comprises a number of audio signatures determined based, at least in part, upon at least one of: a model concurrency, or latency specification of a neural co-processor or accelerator coupled to the processor;
compare, by the neural co-processor or accelerator, a received audio input to at least one audio signature among the subset of audio signatures to the exclusion of any other audio signature of the plurality of audio signatures; and
in response to the comparison indicating a match, perform one or more management actions.

2. The IHS of claim 1, wherein the plurality of audio signatures comprises at least one of: a signature of a voice of a user of the IHS, a signature of a voice man, a signature of a voice of a woman, a signature of a voice of a child, a crying signature, a dog signature, a cat signature, a doorbell signature, a weather signature, a traffic signature, a car signature, a train signature, a home appliance signature, a lawnmower signature, a television signature, a video signature, a music signature, or a radio station signature.

3. The IHS of claim 1, wherein the program instructions, upon execution, further cause the IHS to select the one or more management actions based upon a combination of the match and the context information.

4. The IHS of claim 1, wherein the context information comprises at least one of: an identity of a user, a time-of-day, or a location of the IHS.

5. The IHS of claim 1, wherein the context information comprises a calendar event.

6. The IHS of claim 1, wherein the context information comprises at least one of: an application under execution, or a duration of execution of an application.

7. The IHS of claim 1, wherein the context information comprises at least one of: a user's presence, a user's proximity to the IHS, or a user's gaze direction.

8. The IHS of claim 1, wherein the context information comprises at least one of: a memory usage, a characteristic of a network connection, a power usage, or a connected peripheral device.

9. The IHS of claim 1, wherein the context information comprises an IHS posture.

10. The IHS of claim 1, wherein the one or more management actions comprise selection of a noise cancellation model.

11. The IHS of claim 1, wherein the one or more management actions comprise selection of one of a plurality of fan settings.

12. The IHS of claim 1, wherein the one or more management actions comprise selection of one of a plurality of a power consumption settings.

13. The IHS of claim 1, wherein the one or more management actions comprise execution or cessation of a diagnostics or remediation process.

14. The IHS of claim 1, wherein the one or more management actions comprise execution or cessation of a system update process.

15. The IHS of claim 1, wherein the one or more management actions comprise execution or cessation of a telemetry collection process.

16. The IHS of claim 1, wherein the one or more management actions comprise setting the IHS in a selected security or locked mode.

17. A memory storage device having program instructions stored thereon that, upon execution by an Information Handling System (IHS), cause the IHS to:
select, based upon context information, a subset of a plurality of audio signatures, wherein the context information comprises at least one of: an identity of a user, a time-of-day, or a location of the IHS, a calendar event, an application under execution, or a duration of execution of an application, a user's presence, a user's proximity to the IHS, a user's gaze direction, a memory usage, a characteristic of a network connection, a power usage, a connected peripheral device, or an IHS posture;

compare a received audio input to at least one audio signature among the subset of audio signatures to the exclusion of any other audio signature of the plurality of audio signatures; and in response to the comparison indicating a match, perform one or more management actions.

18. In an Information Handling System (IHS), a method comprising:

selecting, based upon context information, a subset of a plurality of audio signatures;

comparing a received audio input to at least one audio signature among the subset of audio signatures to the exclusion of any other audio signature of the plurality of audio signatures; and in response to the comparison indicating a match, performing a management action comprising at least one of: selection of a noise cancellation model, selection of one of a plurality of fan settings, selection of one of a plurality of a power consumption settings, execution or cessation of a system update process, execution or cessation of a telemetry collection process, or setting the IHS in a security or locked mode.

19. The method of claim 18, wherein the context information comprises at least one of: an identity of a user, a time-of-day, or a location of the IHS, a calendar event, an application under execution, or a duration of execution of an application, a user's presence, a user's proximity to the IHS, a user's gaze direction, a memory usage, a characteristic of a network connection, a power usage, a connected peripheral device, or an IHS posture.

20. The memory storage device of claim 17, wherein the one or more management actions comprise at least one of: selection of a noise cancellation model, selection of one of a plurality of fan settings, selection of one of a plurality of a power consumption settings, execution or cessation of a system update process, execution or cessation of a telemetry collection process, or setting the IHS in a selected security or locked mode.

* * * * *